US009051959B2

(12) United States Patent
Davis

(10) Patent No.: US 9,051,959 B2
(45) Date of Patent: Jun. 9, 2015

(54) HANGING CADDY

(76) Inventor: Roger B. Davis, DeFuniak Springs, FL (US)

( * ) Notice: Subject to any disclaimer, the term of this patent is extended or adjusted under 35 U.S.C. 154(b) by 0 days.

(21) Appl. No.: 13/325,573

(22) Filed: Dec. 14, 2011

(65) Prior Publication Data

US 2013/0153724 A1 Jun. 20, 2013

(51) Int. Cl.
*E06C 7/14* (2006.01)
*B25H 3/06* (2006.01)
*F16B 45/00* (2006.01)

(52) U.S. Cl.
CPC . *F16B 45/00* (2013.01); *B25H 3/06* (2013.01)

(58) Field of Classification Search
CPC ............... B25H 3/06; E06C 7/14; A01G 5/04
USPC ........ 248/225.21, 215, 211; 211/88.01, 87.01
See application file for complete search history.

(56) References Cited

U.S. PATENT DOCUMENTS

| | | | | | |
|---|---|---|---|---|---|
| 2,090,176 | A | | 8/1937 | Besancon | |
| 3,325,038 | A | | 6/1967 | Ferney | |
| 3,474,996 | A | * | 10/1969 | Stamm | 248/210 |
| 3,511,338 | A | * | 5/1970 | Chapman | 182/121 |
| 3,664,626 | A | * | 5/1972 | Sneller | 248/224.7 |
| 4,194,715 | A | * | 3/1980 | Forman et al. | 248/311.2 |
| 4,205,411 | A | * | 6/1980 | Cupp et al. | 15/257.06 |
| 4,480,810 | A | * | 11/1984 | Hall | 248/238 |
| D277,168 | S | * | 1/1985 | Clausen et al. | D8/394 |
| 4,562,984 | A | * | 1/1986 | Sherlock et al. | 248/95 |
| D291,315 | S | * | 8/1987 | Belford et al. | D8/373 |
| 5,465,809 | A | * | 11/1995 | Panicci | 182/121 |
| 5,803,422 | A | * | 9/1998 | Buehler | 248/339 |
| 5,836,043 | A | | 11/1998 | Rovas | |
| D414,165 | S | * | 9/1999 | Klein | D14/432 |
| 6,095,057 | A | * | 8/2000 | Corban | 108/42 |
| 6,273,289 | B1 | | 8/2001 | Bowman | |
| 6,467,744 | B1 | * | 10/2002 | Calin | 248/214 |
| D482,599 | S | * | 11/2003 | May et al. | D8/356 |
| 6,666,342 | B1 | | 12/2003 | House | |
| 6,688,570 | B1 | * | 2/2004 | Mundt | 248/238 |
| D559,084 | S | * | 1/2008 | Foxx et al. | D8/356 |
| 7,354,023 | B1 | * | 4/2008 | Wappler | 248/206.5 |
| D576,435 | S | * | 9/2008 | Snell | D6/522 |
| D628,055 | S | * | 11/2010 | Mills | D8/382 |
| D629,679 | S | * | 12/2010 | Riddell et al. | D8/394 |
| 8,033,362 | B1 | * | 10/2011 | Cull | 182/129 |
| D657,054 | S | * | 4/2012 | Bacon | D24/128 |
| 8,152,005 | B2 | * | 4/2012 | Barkdoll et al. | 211/88.01 |
| 2005/0189458 | A1 | * | 9/2005 | Avinger | 248/301 |
| 2008/0245751 | A1 | * | 10/2008 | Moran | 211/1 |

* cited by examiner

*Primary Examiner* — Terrell McKinnon
*Assistant Examiner* — Daniel Breslin
(74) *Attorney, Agent, or Firm* — Adrienne C. Love

(57) ABSTRACT

The present hanging caddy is comprised of a receptacle and a hook assembly. The receptacle includes a base, sidewalls and a back wall. The hook assembly includes a back member, top member and front member, with a first wedge proximate the front member and a second wedge proximate the back member. The first wedge, top member and second wedge form a vertical slot for accepting a beam. The front member, first wedge, second wedge and back member form a horizontal slot for accepting a beam. The hook assembly and receptacle may be separate components which fit together for use or, in the alternative, can be fully integrated together as one component piece.

16 Claims, 8 Drawing Sheets

HANGING CADDY

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to devices for holding tools and supplies for plumbers. More specifically, the invention comprises a caddy designed to hang securely from a 2×4 beam.

2. Description of the Related Art

A plumber is required to maintain, repair, install, remodel and construct various portions of buildings and homes. In most instances a plumber's work is completed in an environment in which the joists in the floors and/or walls are exposed. This provides plumbers easy access to piping, tubing and other plumbing equipment.

Plumbers often wear tool belts or carry boxes for tools that are needed frequently. For example, plumbers often need tools such as, fittings, primer, glue or flux, which must be readily accessible. While tools can easily be carried on a belt, it is more difficult for plumbers to hold and access cans of primer and glue. Plumbers typically balance these cans (often open) on joists or ladders to maintain access while freeing up their hands for work. However, balancing the cans in this manner results in frequent spills and does not provide the convenience that is necessary for the most efficient hands-free work.

Therefore what is needed is a caddy which can easily attach to a 2×4 joist in order to allow a plumber to access cans of primer and glue. Additionally, the receptacle should be easy to manufacture and transport. The present invention achieves this objective, as well as others that are explained in the following description.

BRIEF SUMMARY OF THE INVENTION

The present invention comprises a receptacle and a hook assembly. The receptacle is comprised of a base, sidewalls and a back wall. The hook assembly is comprised of a back member, top member and front member, with a first wedge proximate the front member and a second wedge proximate the back member. The first wedge, top member and second wedge form a vertical slot for accepting a beam. The front member, first wedge, second wedge and back member form a horizontal slot for accepting a beam. The hook assembly and receptacle may be separate components which fit together for use or, in the alternative, can be fully integrated together as one component piece.

Figure 1:
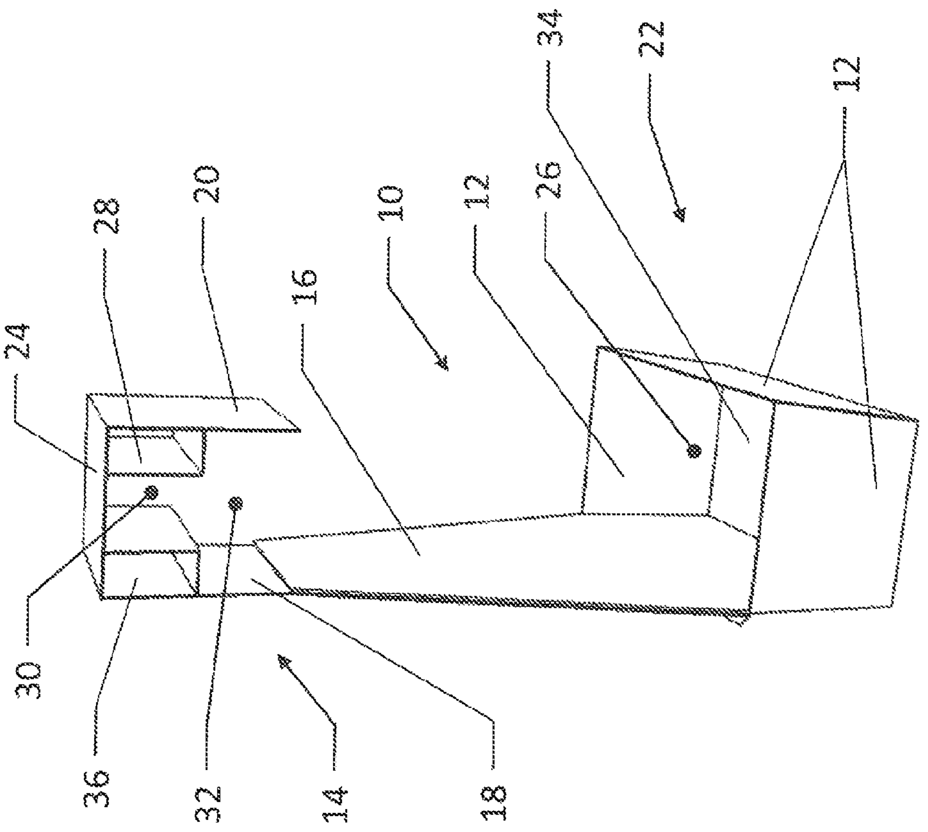
FIG. 1 is a perspective view, showing the present invention.

| REFERENCE NUMERALS IN THE DRAWINGS | |
|---|---|
| 10 caddy | 12 sidewalls |
| 14 hook assembly | 16 back wall |
| 18 back member | 20 front member |
| 22 receptacle | 24 top member |
| 26 opening | 28 first wedge |
| 30 vertical slot | 32 horizontal slot |
| 34 base | 36 second wedge |
| 38 beam | 40 lip |
| 42 hole | 44 multiple receptacles |
| 46 multiple hook assemblies | 48 cans |

DETAILED DESCRIPTION OF THE INVENTION

FIG. 1 illustrates the present caddy 10 in its preferred embodiment. The caddy 10 is generally comprised of receptacle 22 and hook assembly 14. Receptacle 22 includes base 34, at least one sidewall 12 and a back wall 16. Opening 26 is formed within receptacle 22. Supplies, such as fittings, primer, glue or flux can be placed in receptacle 22. Hook assembly 14 is preferably attached to receptacle 26 at back wall 16; however, hook assembly 14 and receptacle 26 could be one integrated unit. Hook assembly 14 is made up of a back member 18 connected to top member 24 and front member 20. Back member 18, top member 24 and front member 20 form a hook which extends forward over the top of receptacle opening 26. First wedge 28 is located proximate to front member 20 of hook assembly 14. Second wedge 36 is located proximate to back member 18. First wedge 28, second wedge 36 and top member 24 form a vertical slot 30. A horizontal slot 32 is formed by front member 20, first wedge 28, second wedge 36 and back member 18. Wedges 28, 36 are integral to the present caddy 10 due to the key interaction, explained herein, with a 2×4 beam. Thus, the location of first wedge 28 and second wedge 36 and both the dimensions of horizontal and vertical slots 32, 30 are important to the functionality of the present caddy 10.

Figure 2:
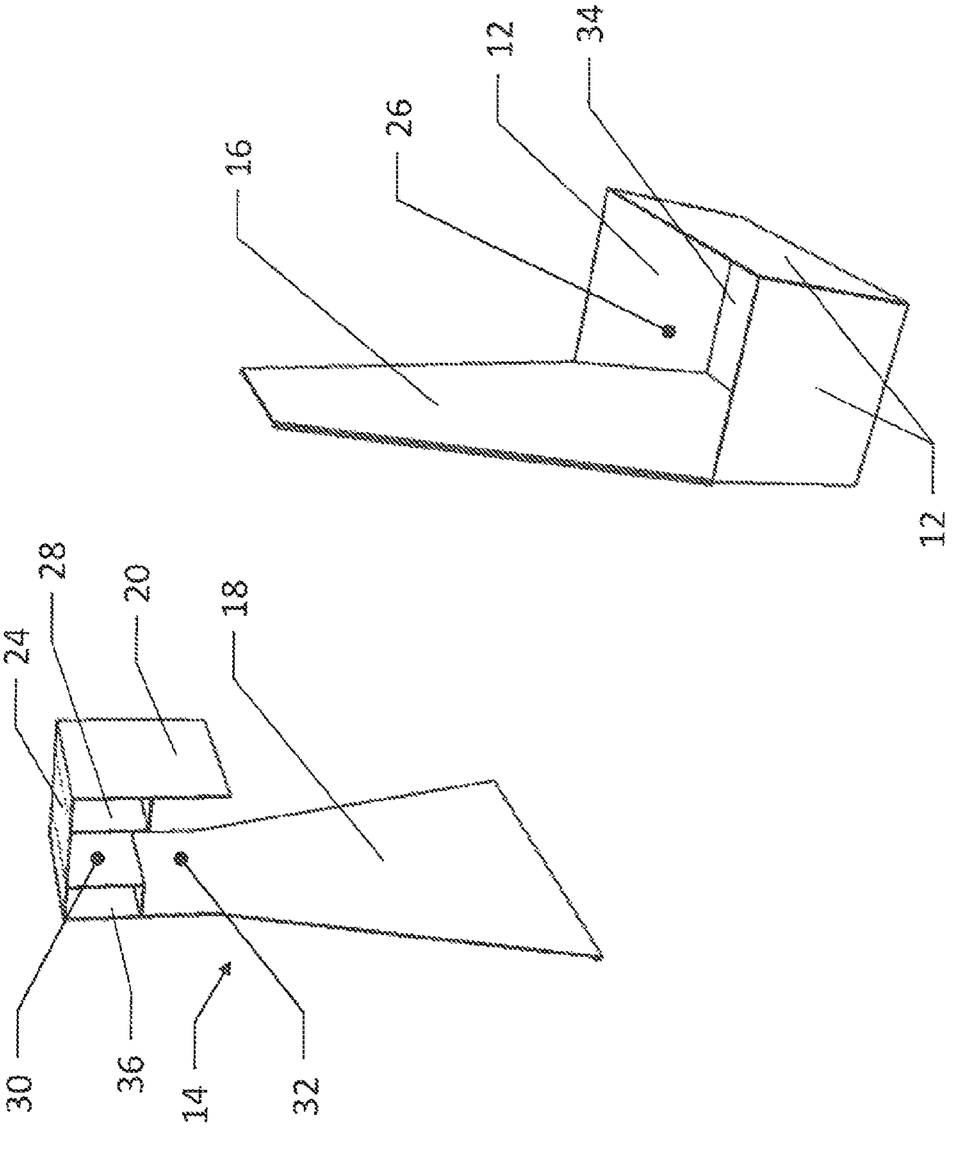
FIG. 2 is a perspective view, showing the receptacle and hook assembly in separate component pieces from a front view.
Figure 3:
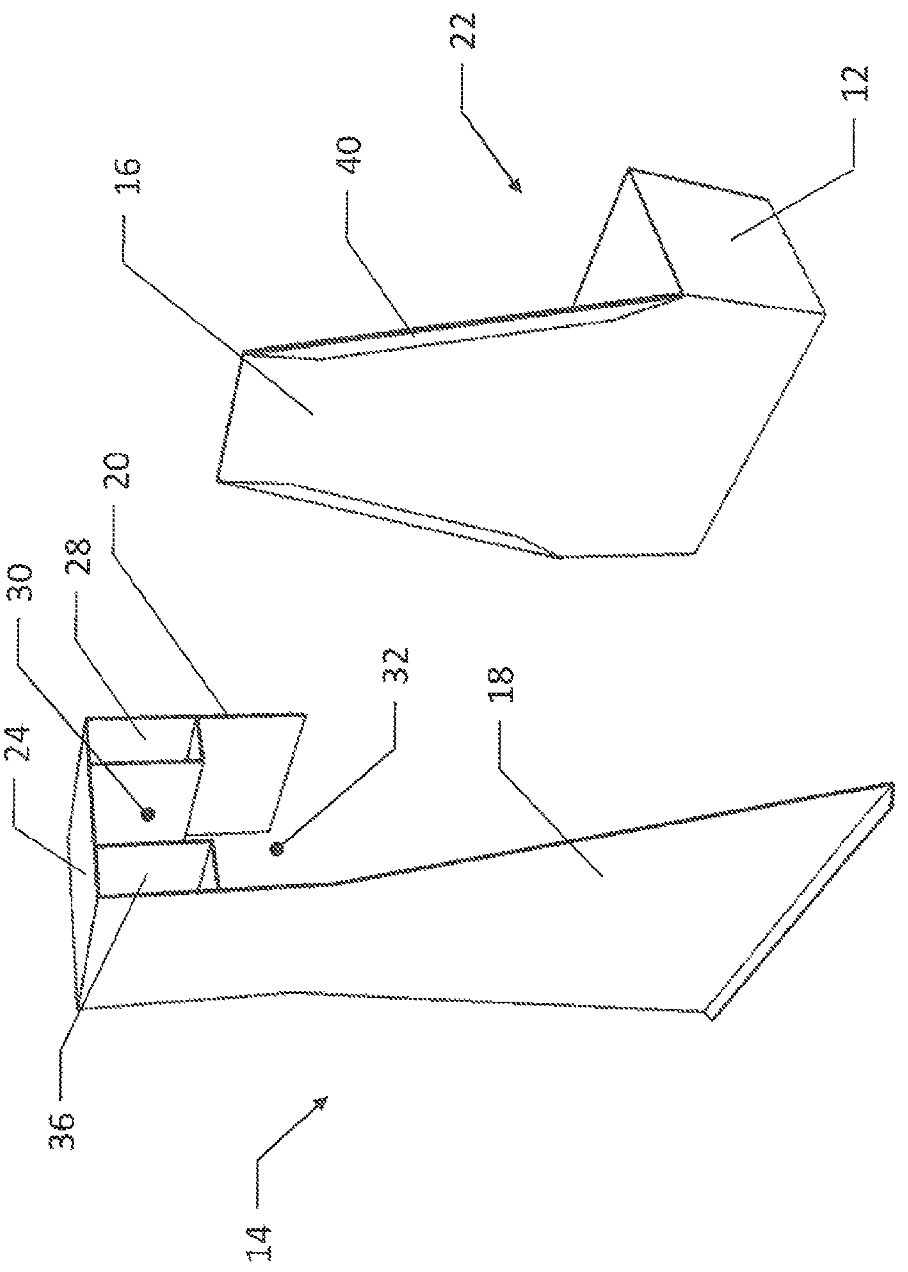
FIG. 3 is a perspective view showing the receptacle and hook assembly as separate component pieces from a rearward view.
Figure 4:
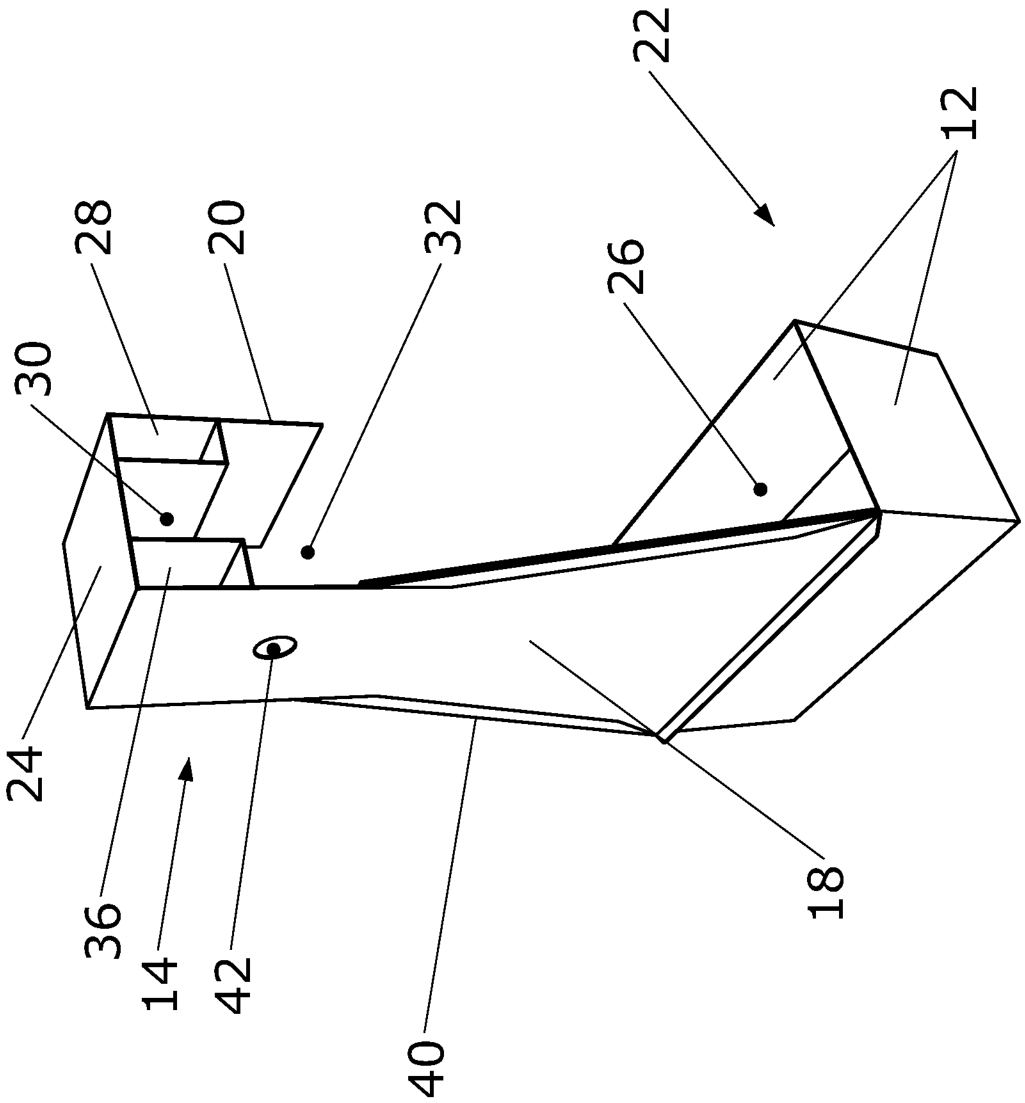
FIG. 4 is a perspective view, showing the hook assembly's attachment to the receptacle.

Hook assembly 14 is shown detached from receptacle 22 of caddy 10 in FIG. 2. The primary purpose of providing caddy 10 in detachable pieces is for ease of shipping the product after manufacture (further illustrated in FIG. 7). As illustrated in FIG. 3, back wall 16 of receptacle 22 includes lip 40. Lip 40 acts as a guide and vehicle for attaching hook assembly 14 to receptacle 22. Back member 18 of hook assembly 14 is shaped such that user can easily slide back member 18 upward along back wall 16 until contact is made with lip 40. FIG. 4 illustrates the hook assembly 14 attached to receptacle 22 from a rearward view. Although the present caddy 10 is illustrated as two separate component parts, the reader will recognize that the receptacle 22 and hook assembly 14 could be one integrated unit. Additionally, other known methods could be used to attach receptacle 22 to hook assembly 14. For example receptacle 22 and hook assembly 14 could simply snap together. An optional hole 42 is shown in back member 18. Hole 42 can accept a nail or hook on a wall for easy storage of the caddy 10 when not in use.

Figure 5:
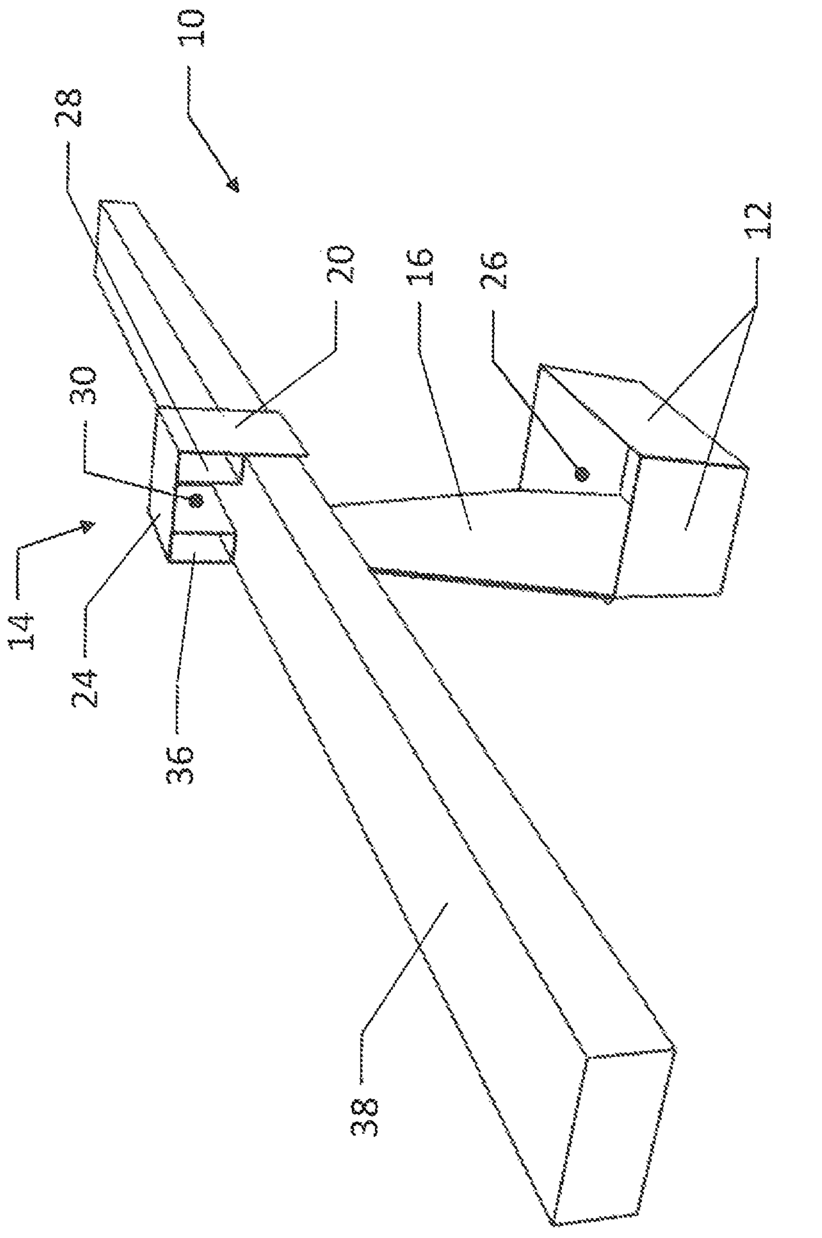
FIG. 5 is a perspective view, showing the horizontal slot on the present caddy accepting beam.
Figure 6:
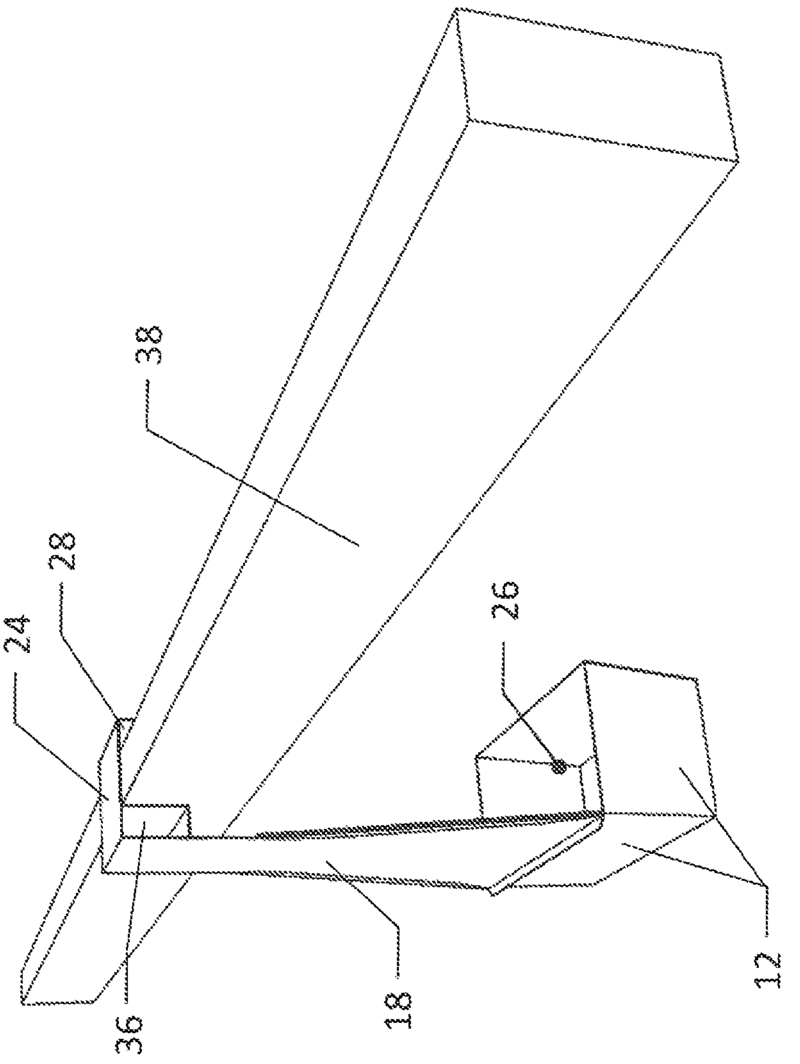
FIG. 6 is a perspective view, showing the vertical slot on the present caddy accepting beam.

The important function of first wedge 28 and second wedge 36 is further illustrated in FIGS. 5 and 6. Caddy 10 can be easily attached to a 2×4 piece of lumber (beam 38), whether the beam is oriented in a horizontal position or vertical position. FIG. 5 is a perspective view, showing the horizontal slot 32 (unlabeled as slot is shown in use) on the present caddy accepting beam 38. Beam 38 is a 2×4 piece of lumber used as a standard in construction. Two-by-four's are not a true 2 inches by 4 inches. Instead, the actual size is approximately 1⅝ inches by 3⅝ inches. Thus, the actual size of horizontal and vertical slot should be close to the actual dimensions of a two-by-four (although this can vary slightly).

As illustrated in FIG. 5, hook assembly 14 accepts beam 38 in a horizontal position at horizontal slot 32 (unlabeled as slot is shown in use). Beam 38 supports caddy 10 at the lower end of first wedge 28 and second wedge 36, while stability and positioning is provided by front member 20 and back member 18. Front member 20 is preferably 4 inches long such that front member 20 has adequate contact with beam 38 in the horizontal positioning. Additionally, the distance between back member 18 and front member 20 must be approximately 3⅝ inches to accept a standard 2×4 beam in a horizontal orientation.

FIG. 6 shows caddy 10 accepting a vertically position 2×4 beam 38 at vertical slot 30. The caddy 10 remains unmodified, however now beam 38 supports caddy 10 at top member 24, while first wedge 28 and second wedge 36 provide stability and positional support. First wedge 28 and second wedge 36 must be approximately 1⅝ inches apart to accept a standard 2×4 beam in a vertical orientation. Due to the fact that 2×4 joists are often in both vertical and horizontal orientations it is important to allow the plumber to utilize either position of beam 38 with the same caddy 10.

Figure 7:
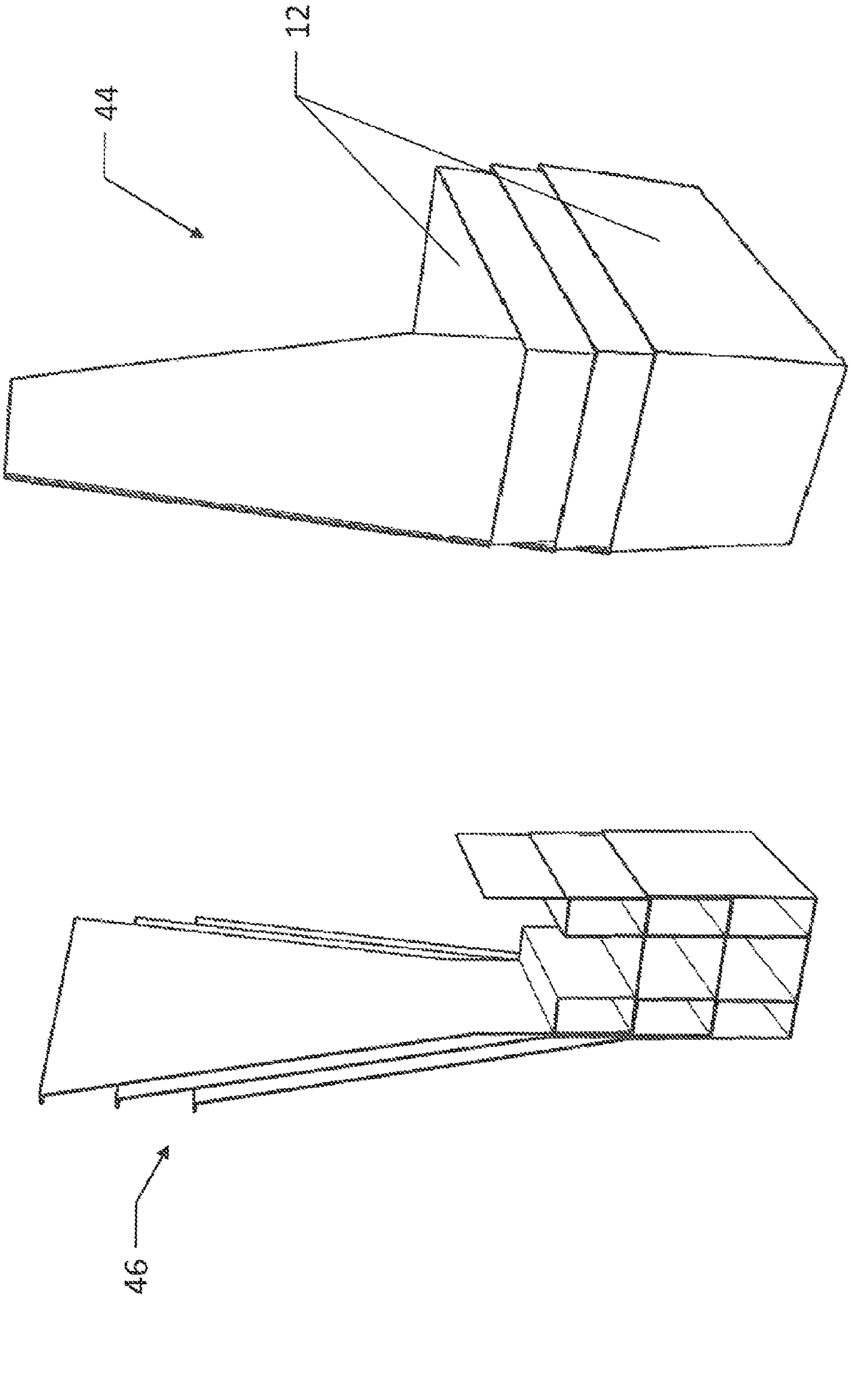
FIG. 7 is a perspective view showing multiple caddies prepared for shipping prior to use.

FIG. 7 illustrates the ease with which the present caddy 10 can be shipped or stored. As shown, multiple receptacles 44 are stacked together. Sidewalls 12 are preferably angled such that opening 26 is wider at the top than at the base 34 (also illustrated in FIG. 2). The angular displacement of sidewalls 12 permits the embedding of multiple receptacles 44 within one another. Likewise multiple hook assemblies 46 can be stacked together. Once received by the owner, the pieces can be easily put together for use.

Figure 8:
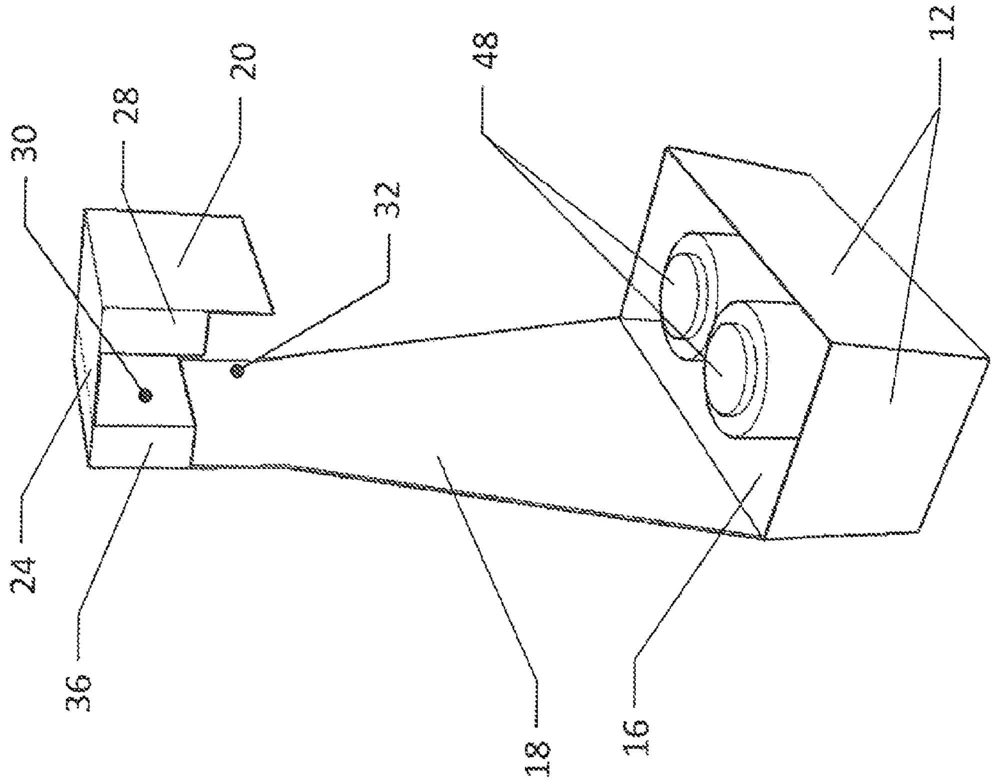
FIG. 8 is a perspective view showing an alternative embodiment of the present invention.

FIG. 8 illustrates caddy 10 in an alternate embodiment formed as one component part. Back wall 16 and back member 18 are fully integrated. The entire caddy 10 could be formed from a plastic material that is resistant and sturdy. The present caddy 10 is shown with cans 48 of primer and glue therein. The orientation of hook assembly 22 (extending over receptacle 22) acts to maintain the stability of caddy 10 itself. Additionally, first wedge 28 and second wedge 36 are shown in FIG. 8 as fully enclosed pieces.

As illustrated, the ease of use and access of supplies for plumbers is significantly improved by the present device. Additionally, the user can place caddy 10 on any 2×4 joist no matter how it is positioned. Due to the nature of plumbing work, this device is particular important to that industry.

Generally, plumbers are often subject to strict requirements to position hardware in exact locations. Plumbers themselves are often required to work in one set position. Thus, plumbers do not have the luxury to easily move about as they work to access materials. The present caddy 10 allows the plumber to move the materials to them by providing flexibility to use multiple hanging surfaces for the plumber to locate the caddy.

The preceding description contains significant detail regarding the novel aspects of the present invention. It should not be construed, however, as limiting the scope of the invention but rather as providing illustrations of the preferred embodiments of the invention. As an example, the back wall 16 and back member 18 could be one integrated unit. Thus, the scope of the invention should be fixed by the following claims, rather than by the examples given.

Having described my invention, I claim:

1. A caddy for attachment to a beam further comprising:
- a. a receptacle having a base, at least one sidewall and a back wall;
- b. a hook assembly having:
  - i. a back member;
  - ii. a top member attached to said back member;
  - iii. a front member attached to said top member;
  - iv. a first wedge proximate said front member;
  - v. a second wedge proximate said back member;
  - vi. wherein said first wedge, said second wedge, said front member and said back member form a horizontal slot such that said beam is capable of supporting said receptacle when oriented within said horizontal slot;
  - vii. wherein said first wedge, said second wedge and said top member form a vertical slot such that said beam is capable of supporting said receptacle when oriented within said vertical slot; and
- c. wherein said hook assembly attaches to said back watt of said receptacle; and
- d. wherein said top member extends over said receptacle.

2. A caddy as recited in claim 1, wherein said horizontal slot is between 3 and ½ inches wide and 3 and ⅝ inches wide.

3. A caddy as recited in claim 1, wherein said vet cal slot is between 1 and ½ inches wide and 1 and ⅝ inches wide.

4. A caddy as recited in claim 1, wherein said receptacle further comprises an opening between at least one sidewall.

5. A caddy as recited in claim 4, wherein said at least one sidewall are angled towards said base such that said opening is smaller closer to the base.

6. A caddy as recited in claim 1, wherein said top member extends forward over said receptacle.

7. A caddy as recited in claim 1, wherein said backwall an said back member are fully integrated into one solid piece.

8. A caddy as recited in claim 1, wherein said back member further comprises a hole.

9. A caddy as recited in claim 1, wherein said back wall further comprises a lip, wherein said tip secures said back member to said back wall.

10. A caddy as recited in claim 1, wherein said back member further comprises a hole.

11. A caddy for attachment to a beam further comprising:
- a. a receptacle having a base, at least one sidewall and a back wall;
- b. a hook assembly having:
  - i. a back member;
  - ii. a top member attached to said back member;
  - iii. a front member attached to said top member;
  - iv. a first wedge proximate said front member;
  - v. a second wedge proximate said back member;

vi. wherein said first wedge, said second wedge, said front member and said back member form a horizontal slot;

vii. wherein said first wedge, said second wedge and said top member form a vertical slot; and c. wherein said hook assembly and said receptacle are one integrated unit;

d. wherein said top member extends over said receptacle;

e. wherein said beam is capable of supporting said caddy by contact with said first wedge and said second wedge; and f. wherein said beam is capable of supporting said caddy by contact with said top member.

12. A caddy as recited in claim 11, wherein said horizontal slot is between 3 and ½ inches wide and 3 and ⅝ inches wide.

13. A caddy as recited in claim 11, wherein said vertical slot is between 1 and ½ inches wide and 1 and ⅝ inches wide.

14. A caddy as recited in claim 11, wherein said receptacle further comprises an opening between said sidewalls.

15. A caddy as recited in claim 11, wherein said at least one sidewall are angled towards said base such that said opening is smaller closer to the base.

16. A caddy as recited in claim 11, wherein said top member extends forward over said receptacle.

* * * * *